United States Patent Office 3,481,145
Patented Dec. 2, 1969

1

3,481,145
ENGINE-STARTING GAS TURBINE SYSTEMS
Thomas Alfred Oldfield, Ilford, Essex, England, assignor to The Plessey Company Limited, Ilford, Essex, England, a British company
Filed Oct. 30, 1967, Ser. No. 678,883
Claims priority, application Great Britain, Nov. 2, 1966, 49,234/66
Int. Cl. F02c 7/02, 7/26, 3/10
U.S. Cl. 60—39.14                        3 Claims

ABSTRACT OF THE DISCLOSURE

In order to permit utilization of a free-turbine starter system as a constant-speed auxiliaries drive, an overrunning clutch is arranged to couple the free power turbine of the starter system to the gas generator when the turbine speed reaches that of the gas generator, thus utilizing the speed control of the gas generator for controlling the output speed of the auxiliaries drive and reducing the fuel supply in accordance with the smaller load while maintaining the combustion air supply unaltered.

Figure 1:
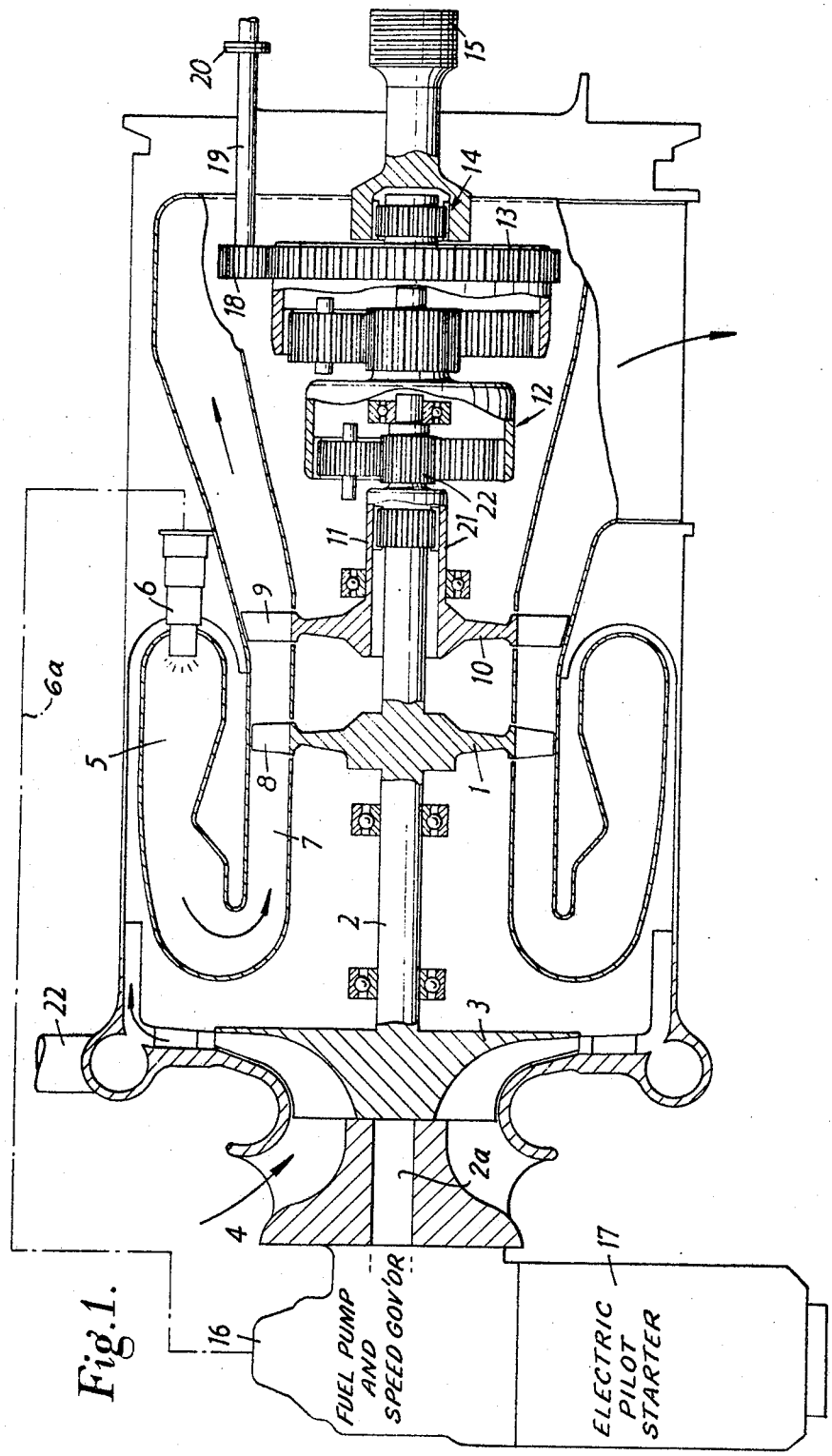

When the free-turbine output is applied to the engine to be started via a power compressor feeding a starter air turbine, a valve is provided for throttling the inlet to that compressor after completion of the starting operation.

---

This invention relates to engine-starting gas turbine systems and has for an object to provide an improved system which permits the gas turbine to be used not only for starting the engine but also, during the normal operation of the engine or when the engine is disconnected, for the drive of auxiliary equipment, for example for driving an electric generator or other auxiliary equipment, at a constant or controlled speed.

The invention constitutes a further development of a gas-turbine system, supplied by The Plessey Company Limited under the name Solent Gas-Turbine Starter, in which the starter-output shaft is driven through reduction gearing by a gas-turbine wheel operated as a so-called free gas turbine by combustion gases from a combustion chamber which have previously passed through the blading of the turbine wheel of a so-called gas generator, the latter turbine wheel being arranged coaxially with the former and driving a compressor which supplies air to a combustion chamber from which combustion gases pass in series first through the blading of the gas-generator turbine and then through the blading of the free turbine, the gas generator being equipped with a fuel governor maintaining its speed substantially constant.

In a modification of the Solent Gas-Turbine Starter, described in co-pending U.S.A. patent application No. 649,982, the gearing is replaced by a power compressor whose delivery feeds a starter air-turbine.

It will be readily appreciated that when in either case the engine has been started and become self-sustaining, the output power of the free turbine is no longer required for starting purposes, but its use for the drive of auxiliary equipment has hitherto been found difficult because, in view of the short duration of the starting operation, the turbine is, in order to avoid unnecessary weight, rated only for short-term operation at its full load, so that the loading of the free turbine for purposes of driving auxiliaries must be considerably reduced compared with its loading during starting, while on the other hand in the Solent Gas-Turbine Starter the fuel governor provided is controlled by the speed of the gas generator and not of the free turbine, so that the necessary speed control for the auxiliary drive would involve a complex control system.

According to the present invention an over-running clutch is interposed between the free turbine and the gas generator in such manner as to couple the free turbine with the gas generator when the speed of the free turbine tends to exceed a predetermined ratio to the speed of the gas generator but to separate the free turbine from the gas generator when the ratio of the speed of the free turbine to that of the gas generator tends to be below this predetermined ratio.

With this arrangement the operation of the system during starting of the engine is identical with that of the above-described Solent Gas-Turbine Starter or its modification while when, after the engine has become self-sustaining, the engine has become decoupled from the starter turbine for example by a starter-overrunning clutch, so that now the auxiliaries constitute the only load on the free turbine, the speed of the free turbine will rise, and when it equals the speed of the gas generator the free turbine is coupled to the gas generator by the overrunning clutch. In these circumstances the free turbine will transmit back to the gas generator the excess of its torque over the load torque, thus tending to increase the speed of the gas turbine generator and thus will cause the fuel governor to reduce the amount of fuel supplied to the combustion chamber. In this manner the head loading of the system is automatically reduced from that of the short term rating intended for the starting operation to the lower heat loading of the long-term rating applicable to the auxiliary drive operation; at the same time, due to the rigid coupling of the two turbine wheels, the fuel governor which controls the speed of the gas generator, will now also govern the speed of the auxiliary-drive output. Although, as above explained, the amount of fuel supplied is reduced, the throughput of air will, with this kind of operation, remain substantially equal to that which existed during the starting operation since the speed of the gas generator remains unchanged. This comparatively high throughput of air per unit of combustion heat contributes further to reducing the operating temperature of the gas-turbine system for a given auxiliary power head. This contrasts with the behaviour of a free-turbine system in which the gas generator and the free turbine remain mechanically independent and in which the reduction in fuel supply due to the reduced load of the free turbine after completion of the engine starting operation will reduce the torque, and thus the speed of the gas generator, resulting in a reduction of its air throughput.

Figure 2:
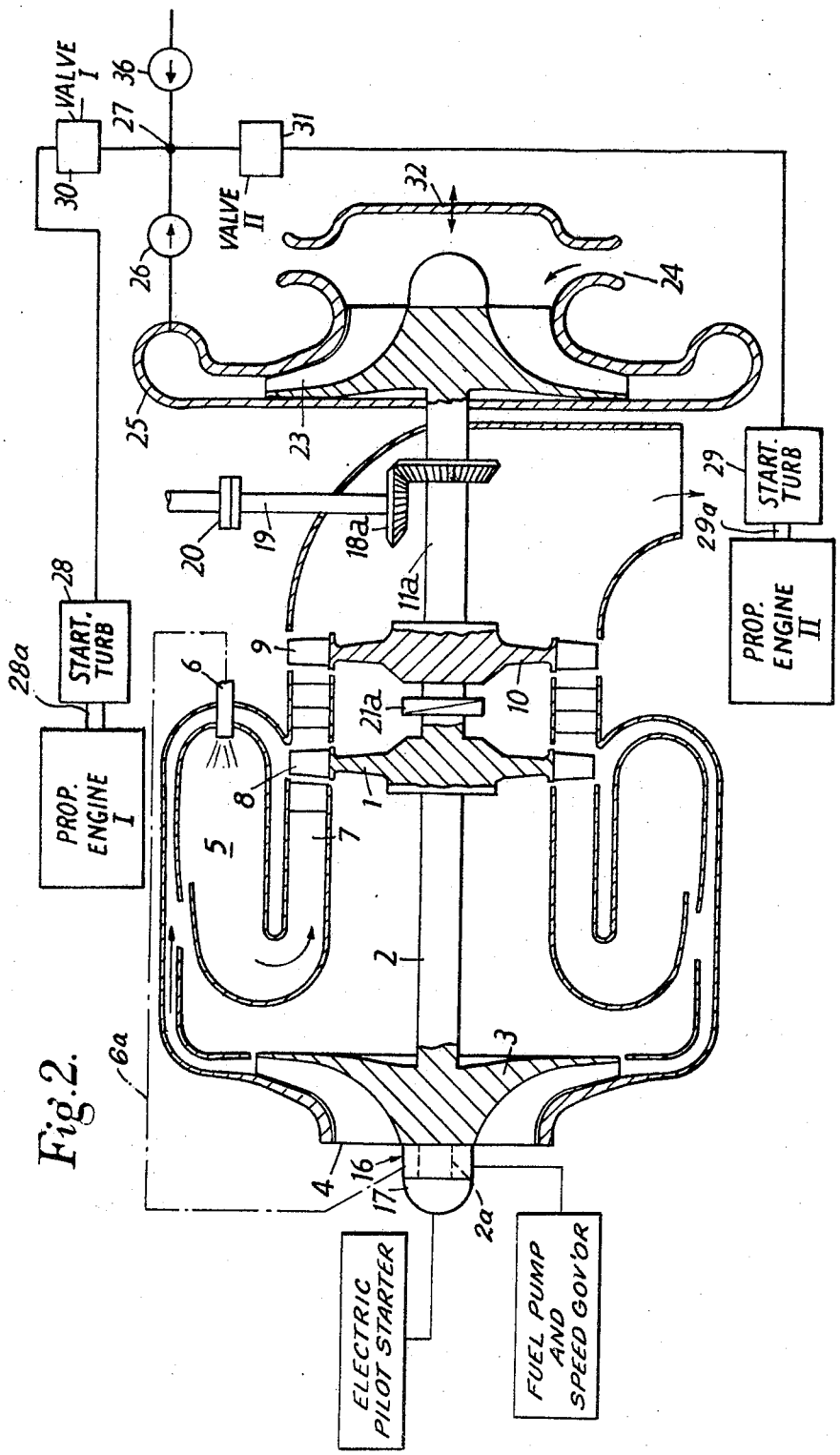

In the accompanying drawing,

FIGURE 1 is a somewhat diagrammatic axial section of one form of turbine system incorporating the present invention as applied to the Solent Gas-Turbine Starter, and FIGURE 2 shows it as applied to a modified gas-turbine starter.

Referring now first to FIGURE 1, the gas generator comprises a turbine wheel 1, mounted on a common shaft 2 with a dynamic compressor wheel 3 which supplies air admitted through an inlet 4 to an annular combustion chamber 5 equipped with fuel-injection and ignition means 6. From this chamber the hot combustion gases enter an annular passage 7, where they encounter in succession first the blading 8 of the turbine wheel 1 of the gas generator and then the blading 9 of a coaxially arranged second turbine wheel 10 carried by a sleeve shaft 11 rotatable independently of the shaft 2. This sleeve shaft 11 drives through reduction gearing 12, an output gear element 13, and the latter drives, through an overrunning clutch 14, a starter-output shaft 15 arranged coaxially with the common shaft 2 and the sleeve shaft 11. The supply of fuel to the injection system 6 is effected via a line 6a and is controlled by a combined fuel pump and governor device 16. This device is arranged at that end of the system which faces away from the output shaft 15 and is drivingly connected with the shaft 2 of the gas generator by an extension shaft 2a; an electric pilot starter motor 17, shown attached to the fuel pump and governor system 16, is also drivingly connected to the shaft 2 in order to raise the gas generator to its operating speed at the beginning of an engine-starting operation.

The system as so far described is substantially identical with the Plessey Solent engine-starter system above referred to. In accordance with the present invention the system is further adapted for the continuous drive of engine auxiliaries at a substantially constant or controlled speed after the completion of the starting operation. For this purpose the output gear element 13 is further arranged to drive through gearing 18 an auxiliary output shaft 19 containing a disengageable clutch 20, and the connection between the sleeve shaft 11 of the free-turbine wheel 10 and the reduction gearing 12 is effected through a second overrunning clutch 21 which couples the sleeve shaft 11 rigidly to the shaft 2 of the gas generator when the speed of the sleeve shaft reaches that of the shaft 2.

An air bleed 22 permits a limited amount of bleed air to be derived from the compressor of the gas generator for use during a starting operation, before bleed air from the main engine compressor becomes available.

Referring now to FIGURE 2, it will be noticed that corresponding elements have been indicated by the same references, thus making it unnecessary to describe again that part of the construction which is substantially identical with that of FIGURE 1. The main difference is that the mechanical drive of the starter-output shaft 14 from the free-turbine wheel 10 is replaced by a pneumatic drive mainly constituted by a power compressor having a rotor 23 fixed on the shaft 11a of the free-turbine wheel 10. This power compressor aspires air from an inlet 24 and delivers compressed air via a volute 25, a non-return valve 26, and a manifold 27 to either of two air motors in the form of starter turbines 28 and 29 respectively associated via a starter-output shaft 28a or 29a with two propulsion engines of an aircraft, the selection being effected by valves 30 and 31.

Similarly to the previous example, an auxiliary output shaft 19 including a clutch 20 is connected to the shaft 11a of the free-turbine wheel 10 by getting 18a, and an overrunning clutch 21a is so interposed between the shafts 2 and 11a of the two turbines as to couple the two shafts when the free-turbine wheel 10 tends to exceed the speed of the turbine wheel 1 of the gas generator. Bleed air may, if desired, be tapped from the gas-generator compressor 25, and the load constituted by the idling power compressor after completion of the starting operation may be reduced by operating an adjustable throttle member 32 to restrict the entry of air to the power compressor through inlet 24 to a desired extent or exclude it altogether, the power thus saved being available for other duties, for example the drive of hydraulic pumps or electrical generators.

The manifold 27 has a subsidiary inlet controlled by a second non-return valve 36 in order to permit the engines to be started by compressed air from an external source when this is available.

Various modifications may be applied to the illustrated embodiment within the scope of the invention. More particularly if it is desired to protect the overrunning clutch from the high temperatures likely to prevail at the adjacent ends of the respective shafts of the gas generator and /the free turbine, the overrunning clutch may be incorporated in a lay shaft which is arranged outside the turbine and generator housing proper. In this case that end of this lay shaft which is permanently drivingly connected with the gas generator, may conveniently be used for the drive of, for example, a fuel backing pump for the fuel supply to the combustion chamber.

What I claim is:
1. A gas-turbine system for starting an engine by accelerating it to a predetermined starter-decoupling speed and for the drive of engine accessories after completion of the starting operation, comprising a starter output shaft, a free turbine for driving said shaft, a gas generator including a gas turbine and a compressor feeding a combustion chamber for the supply of combustion gas to both the free turbine and the gas-generator turbine, an auxiliaries-drive shaft connected to be driven by one of said turbines, automatic fuel-supply control means for the gas-generator turbine operative to maintain the speed of said gas generator at a substantially constant value having a predetermined ratio to said starter-decoupling speed, an overrunning clutch which couples the free turbine with the gas generator turbine to transmit driving torque from the free turbine to the gas generator turbine when the speed of the free turbine reaches a speed having such a ratio to the gas-generator turbine speed as to correspond to starter decoupling speed when the gas generator turbine speed is at said substantially constant value, while separating the free turbine from the gas generator turbine when the speed of the free turbine drops below such ratio to that of the gas generator.

2. A system as claimed in claim 1 and including an air motor connected to the starter output shaft, wherein the power transmission from the free turbine to the starter output shaft is effected by a dynamic air compressor driven by the free turbine and arranged to feed said air motor, a throttle valve being arranged in the inlet of the said air compressor to reduce windage loss in said compressor during operation of the system for the supply of auxiliary power when no starting power is required.

3. A system as claimed in claim 1, wherein the auxiliary-drive shaft is connected to be driven by the gas-generator turbine.

References Cited
UNITED STATES PATENTS

| | | | |
|---|---|---|---|
| 2,431,398 | 11/1947 | Hasbrouck. | |
| 2,914,918 | 12/1959 | Kaplan | 60—39.14 X |
| 3,048,005 | 8/1962 | Egli et al. | 60—39.14 X |
| 3,133,416 | 5/1964 | Mock | 60—39.16 |
| 3,157,993 | 11/1964 | Duttmann | 60—39.14 |

CARLTON R. CROYLE, Primary Examiner

ALLAN D. HERRMANN, Assistant Examiner

U.S. Cl. X.R.

60—39.16, 39.18; 230—114